US006666263B2

(12) United States Patent
Luz et al.

(10) Patent No.: US 6,666,263 B2
(45) Date of Patent: Dec. 23, 2003

(54) DEVICE FOR COOLING A VEHICLE APPLIANCE, IN PARTICULAR A BATTERY OR A FUEL CELL

(75) Inventors: Klaus Luz, Herrenberg (DE); Herbert Damsohn, Aichwald (DE); Conrad Pfender, Besigheim (DE); Peter Geskes, Stuttgart (DE); Friedrich Brotz, Stuttgart (DE)

(73) Assignee: Behr GmbH & Co. (DE)

( * ) Notice: Subject to any disclaimer, the term of this patent is extended or adjusted under 35 U.S.C. 154(b) by 21 days.

(21) Appl. No.: 10/174,871

(22) Filed: Jun. 18, 2002

(65) Prior Publication Data

US 2002/0195237 A1 Dec. 26, 2002

(30) Foreign Application Priority Data

Jun. 23, 2001 (DE) .......................... 101 30 369

(51) Int. Cl.⁷ ................................ F28D 1/02
(52) U.S. Cl. ................ 165/153; 165/166; 165/41
(58) Field of Search ........................ 165/153, 178, 165/176, 166, 41, 42, 58; 62/525

(56) References Cited

U.S. PATENT DOCUMENTS

| 2,058,057 A | * | 10/1936 | Brunst ..................... 165/148 |
| 4,966,227 A | * | 10/1990 | Andersson ............... 165/167 |
| 5,042,577 A | * | 8/1991 | Suzumura ................ 165/153 |
| 5,718,286 A | | 2/1998 | Damshohn et al. ....... 165/167 |
| 5,836,383 A | | 11/1998 | Zwittig .................... 165/167 |
| 5,911,273 A | | 6/1999 | Brenner et al. ........... 165/167 |
| 6,047,769 A | | 4/2000 | Shimoya et al. .......... 165/153 |
| 6,070,428 A | * | 6/2000 | Higashiyama et al. .... 62/525 |
| 6,106,972 A | | 8/2000 | Kokubo et al. ........... 429/120 |
| 6,378,603 B1 | * | 4/2002 | Shimoya et al. .......... 165/153 |
| 6,401,804 B1 | * | 6/2002 | Shimoya et al. .......... 165/70 |

FOREIGN PATENT DOCUMENTS

| DE | 3141161 | 5/1983 |
| DE | 4431413 | 2/1996 |
| DE | 4438393 | 5/1996 |
| DE | 19523475 | 11/1996 |
| DE | 19528116 | 2/1997 |
| DE | 19528117 | 2/1997 |
| DE | 19639114 | 3/1998 |
| DE | 19639115 | 3/1998 |
| DE | 19723159 | 12/1998 |
| GB | 2107845 | 5/1983 |
| WO | WO 9606320 | 2/1996 |
| WO | WO 9855814 | 12/1998 |

* cited by examiner

Primary Examiner—Terrell McKinnon
(74) Attorney, Agent, or Firm—Ostrolenk, Faber, Gerb & Soffen, LLP

(57) ABSTRACT

The device is used to cool a vehicle appliance, in particular a battery or a fuel cell, by means of a coolant. It has a plurality of identically designed cooling elements, through which coolant can flow, which can be brought into bearing contact to cool at least one component of the vehicle appliance. It includes a first cooling-element side and a second cooling-element side which is on the opposite side from the first cooling-element side. The cooling-element sides have connection openings, which form inlet and outlet openings for the coolant and are in communication with the interior space of the cooling element. In this arrangement, it is provided for the first and second cooling-element sides each to have at least two connection openings.

26 Claims, 5 Drawing Sheets

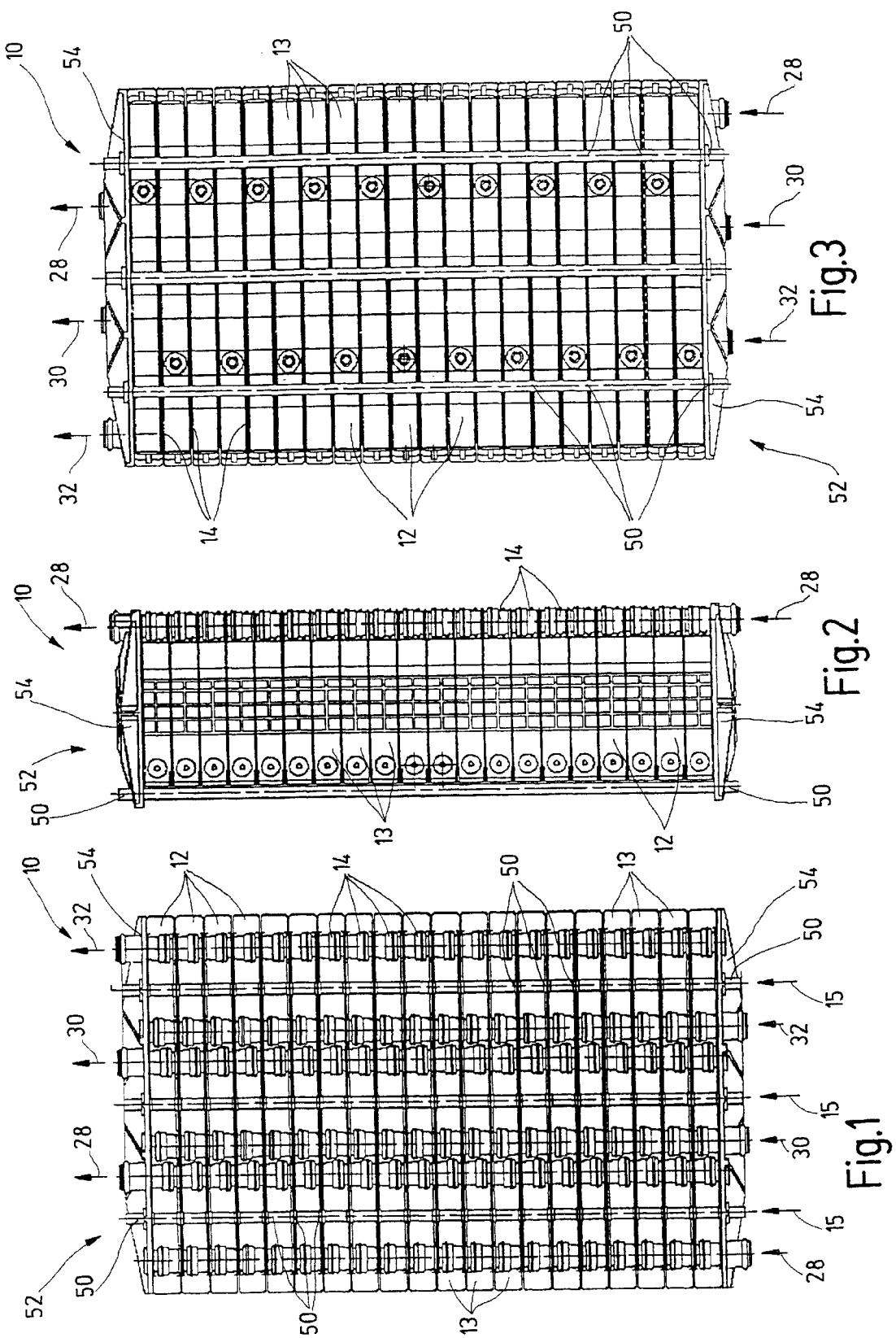

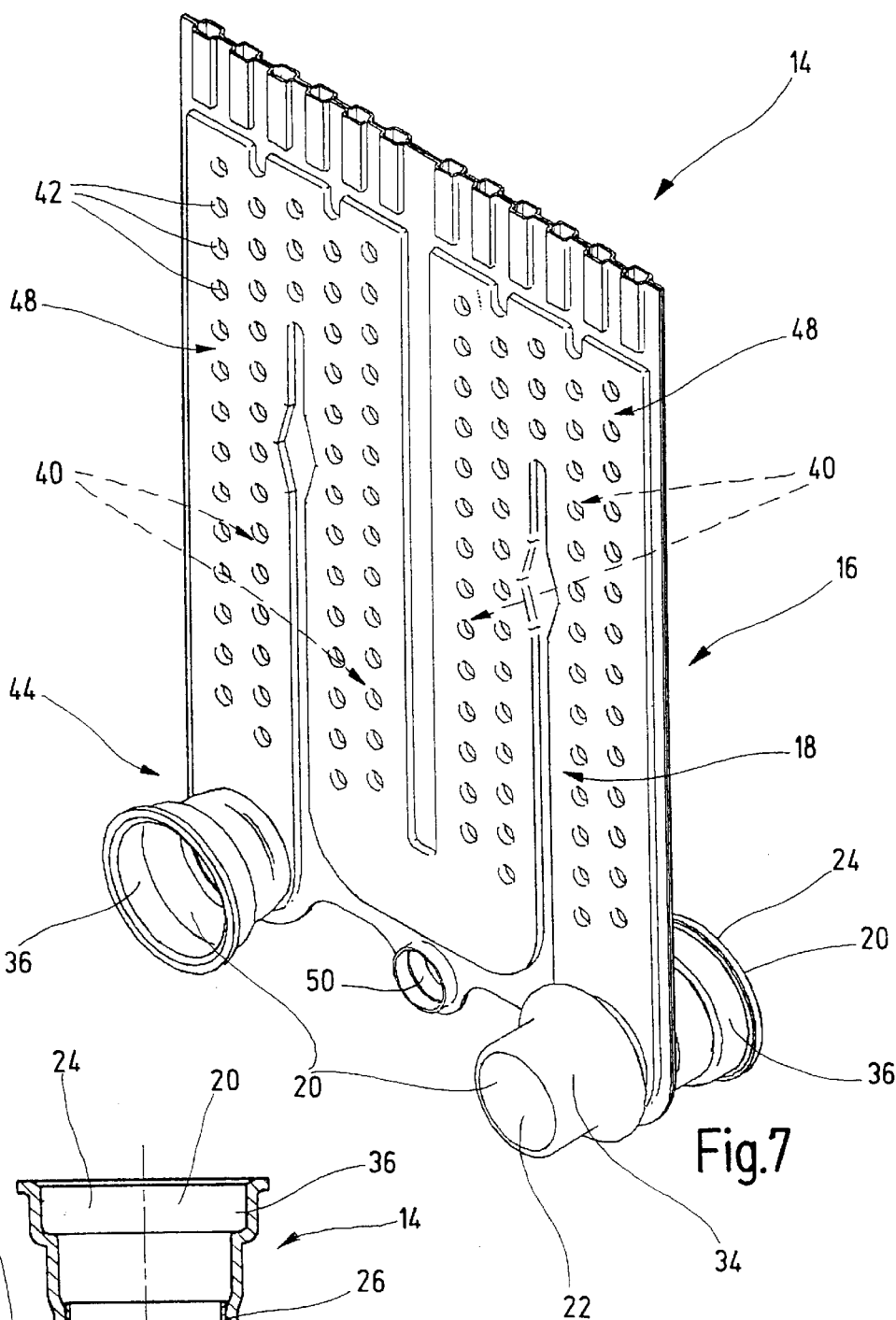
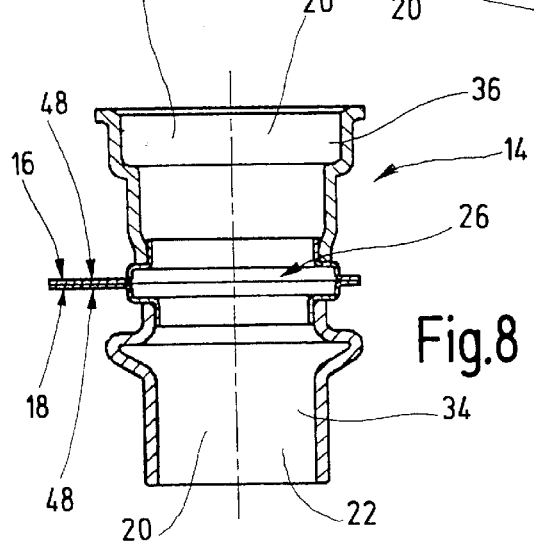
Fig.7
Fig.8

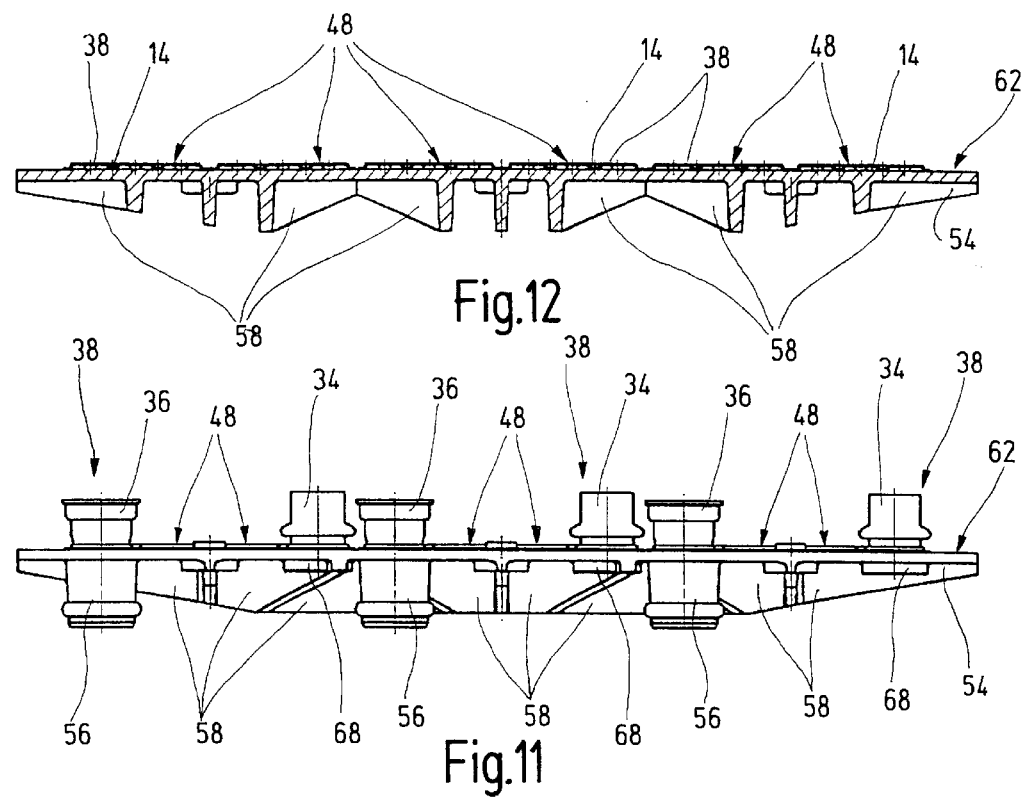
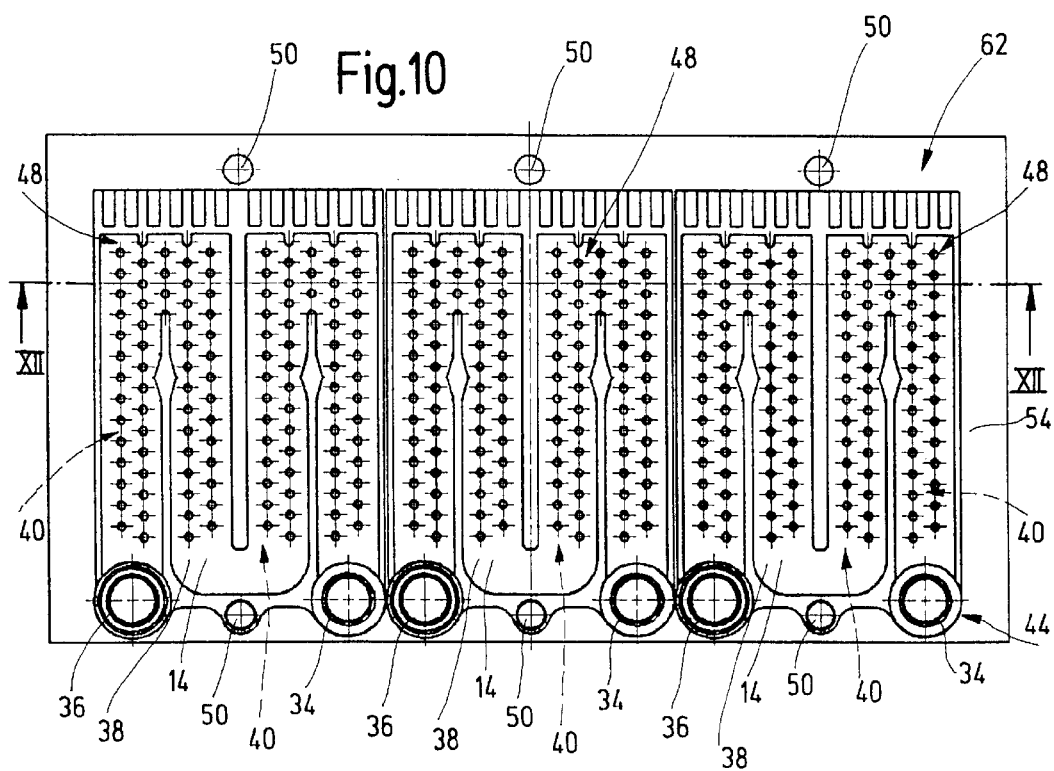

DEVICE FOR COOLING A VEHICLE APPLIANCE, IN PARTICULAR A BATTERY OR A FUEL CELL

BACKGROUND OF THE INVENTION

The invention relates to a device for cooling a vehicle appliance, in particular a battery (for a 42 V electrical system or for hybrid vehicle) or a fuel cell, by means of a coolant. The device has a plurality of identically designed cooling elements through which coolant can flow. These elements can be brought into bearing contact with at least one component which is to be cooled in the vehicle appliance. The elements have a first cooling-element side and an opposite second cooling-element side. The cooling-element sides have connection openings which form inlet and outlet openings for the coolant and are in communication with the interior space of the cooling element.

Devices of this type are known. DE 196 39 115 A1 discloses a plate-like heat exchanger element having one or more flow passages which are laterally separated from one another and run in the interior of the plate, substantially parallel to the plane of the plate, and between respective inlet and outlet points. On each side of the plate-like heat exchanger element, there is a connection opening. Each connection opening forms an inlet or outlet opening for the coolant. These known heat exchanger elements can be used, for example, as a cooling element for high-temperature batteries of electric vehicles. A drawback is that when coolant flows through heat exchanger elements of this type, there is a relatively high loss of operating pressure. Consequently, a relatively complex coolant supply system has to be used to pass the coolant through one or more heat exchanger elements if the required operating pressure is to be built up.

SUMMARY OF THE INVENTION

It is an object of the invention to provide a device of this type which experiences relatively low losses of operating pressure when coolant passes through the cooling elements.

To achieve the object, the invention proposes a device, which is distinguished by the first and second cooling-element sides each having at least two connection openings. This allows coolant to pass through a plurality of cooling elements with reduced pressure losses. This advantageous effect increases as the number of connected cooling elements rises. Therefore, a cooling element may have one or two inlet openings for feeding coolant into the interior space of the cooling element and two outlet openings for discharging the coolant from the latter, or for transferring it into a further cooling element. If there is only one inlet opening in the interior of the corresponding cooling element in order to supply this cooling element, the second inlet opening of the same cooling element may be covered in a suitable way. In addition to the reduced losses in operating pressure, cooling elements with two inlet openings ensure that coolant more rapidly passes through the interior space of the element.

Advantageously, an outlet opening of a cooling element is operatively connected to an inlet opening of a further cooling element. Therefore, a single coolant-feed unit can be used to supply coolant to any desired number of cooling elements which are operatively connected to one another, while ensuring a reduced loss of operating pressure.

The connection openings are preferably designed as projections. This enables producing an operative connection between a respective outlet opening of a first cooling element and an associated inlet opening of a second cooling element, which openings are spaced apart so as to form a receiving space for the insertion, for example, of cells of the vehicle appliance which are to be cooled. This makes it possible to create a stable and compact cooling element/cell sandwich structure, with coolant passing through the cooling elements which are operatively connected to one another and in an operationally favorable manner. Alternatively, instead of projections it is also possible to use separate connecting elements (connection tubes) for producing an operative connection between two cooling elements.

Advantageously, an inlet opening of a respective cooling element, located on a first cooling-element side, is arranged coaxially with an outlet opening on a second cooling-element side of the same cooling element. This permits a uniform space to be formed between each two cooling elements which are arranged opposite one another and are operatively connected to one another. Furthermore, a coaxial, diversion-free operative connection of two associated connection openings allows effective reduction of undesirable operating pressure losses in a corresponding transition region between the connection openings.

According to a preferred embodiment, the inlet openings and the outlet openings of a respective cooling element are designed in complementary fashion with respect to one another, as connection stubs or sockets, respectively. In particular, complementary projections of this type make it relatively easy to produce an accurately fitting socket/connection stub operative connection. This prevents leaks of coolant, between two cooling elements which are arranged at a distance from one another, if appropriate with an appropriate seal inserted between them.

Advantageously, each cooling element comprises two geometrically identical cooling element halves which are connected to one another in such a manner as to prevent leaks of coolant. Element halves which are designed in this way are relatively easy to produce and assemble to form a cooling element in terms of the manufacturing technology required.

In a refinement of the invention, each cooling element has a coolant passage which winds from an inlet opening on a first cooling-element side to an outlet opening on a second cooling-element side. Each cooling element has at least two connection openings on the first and second cooling-element sides, and in particular in the case of a coolant passage which winds, for example, in an M shape, this promotes rapid, operationally favorable passage of coolant through the cooling element combined, at the same time, with a reduced operating pressure loss.

The element halves preferably include a plurality of stabilizing studs which are spaced apart from one another. In each case, two stabilizing studs which lie opposite one another are in bearing contact with one another at their end sides. The stabilizing studs, which in particular are stamped inward, are used to provide the cooling elements with a required basic stability or compressive strength, particularly if a plurality of cooling elements are mechanically clamped to produce a compact cooling element/cell sandwich structure with the cells arranged between them. The stabilizing studs increase the overall rigidity of the respective cooling element and ensure a substantially planar design of the cooling element sides which are intended to be in bearing contact with the cells, even after mechanical clamping between the sandwich components (cooling elements, cells) bearing against one another. In this way, operationally favorable passage of coolant through the respective coolant passage and optimized heat transfer from a cell which is to be cooled to the corresponding contact surfaces of the cooling elements which are in bearing contact with the cell are ensured.

According to a preferred embodiment, the connection openings of a respective cooling element are arranged in an edge region on the corresponding cooling-element side. This allows the cells which are to be cooled to be pushed into the spaces between two opposite cooling elements in a single assembly direction. Therefore, it is possible for a plurality of cooling elements to be preassembled to form a dimensionally stable assembly and to be brought into operative connection with a corresponding number of suitably arranged cells by means of a simple pushing movement in a single assembly direction. Then, the entire system can be mechanically clamped together.

The element halves are advantageously designed as surface-structured half shells, so as to form a respective substantially planar contact surface. The surface structuring is used to dimensionally stabilize the half-shells and therefore also the cooling element, while the formation of a substantially planar contact surface is used for effective heat transfer of one cell of the vehicle device which is to be cooled to a cooling element which is in bearing contact.

The cooling elements advantageously each include a through-opening, which is not operatively connected to the coolant passage, for mechanically clamping the cooling elements with vehicle components arranged between them. Mechanical to clamping of successively arranged cooling elements and vehicle components arranged between them (for example cells), so as to form a sandwich structure, which is reliable and also easy in terms of installation, is enabled by through-openings of this type.

According to a further refinement of the invention, the cooling elements are part of a cooling element which, on each end side, has one connection element which includes at least one through-opening and is operatively connected to an associated, intervening element half of a cooling element in such a manner as to prevent leaks of coolant. This type of cooling unit enables designing a particularly dimensionally stable, easy-to-assemble construction, comprising preferably a plurality of cooling elements which are arranged one after the other and are operatively connected to one another. The unit has suitably designed connection elements at its end sides. This ensures a defined supply and removal of coolant to and from the cooling element. It also is intended to impart sufficient stability to the unit for mechanical clamping. For this purpose, the connection elements may, on their outer side, each have component reinforcing fins and may, on their inner side, each have a planar contact surface.

The cooling elements are preferably connected to one another in such a manner as to prevent leaks of coolant. This is done with an operative connection between an inlet opening of a first cooling element and an outlet opening of an opposite, second cooling element. Therefore, two cooling elements which lie opposite one another are operatively connected to one another by two connection openings in a manner as to prevent leaks of coolant. The connection openings may be operatively connected to one another with separate connection elements between them or preferably by means of connection of suitably designed projections on the corresponding cooling elements.

Preferably, inlet and outlet openings of a cooling element, which are arranged coaxially with respect to one another, are directly connected to one another, to form an axial through connection through the cooling element. The associated coolant passage, which extends substantially perpendicular thereto, is connected to the through connection. In this way, the coolant which passes through one cooling element can flow through a respective inlet opening into the coolant passage and/or can directly reach the outlet opening in the same cooling element, which lies coaxially with respect to the inlet opening. Therefore, if appropriate, part of the stream of coolant can flow from a first cooling element coaxially through the inlet and openings thereof into a second, opposite cooling element, without having to pass through the coolant passage. This allows coolant which has not yet been heated or has only been slightly exposed to transferred heat to pass rapidly through all the cooling elements arranged in succession, which is favorable for operation. This advantageously produces relatively low losses of operating pressure, on account of the partial passage through the cooling elements, which is more favorable in terms of flow. This results from a direct connection (bypass connection with respect to the coolant passage) through coaxially arranged inlet and outlet openings of a cooling element, which are directly connected to one another.

The cooling elements which are operatively connected to one another and the connection elements arranged at the end sides are advantageously prefabricated or preassembled as a stable assembly, in order to produce an operative connection, particularly to a plurality of vehicle components which are to be cooled, so as to form a sandwich structure. A prefabricated or preassembled and in particular dimensionally stable assembly of this type can be operatively connected, in a manner which is particularly easy to handle, to a vehicle appliance which is to be cooled, for example in the form of a battery or a fuel cell, since it is merely necessary to produce bearing contact between the corresponding contact surfaces of the cooling elements and the vehicle components. If appropriate, there may be additional mechanical clamping of all the elements and components which are operatively connected to one another.

According to a preferred embodiment, each of the connection elements are operatively connected to element halves of cooling elements, which are connected in parallel with one another, in a manner which prevents coolant leaks. The modular design makes it possible to produce different series and/or parallel arrangements of cooling elements so as to form a dimensionally stable assembly in a relatively simple way. Suitable designing of the connection elements also allows a defined supply or discharge of coolant to be achieved by means of suitable coolant openings in the connection elements. It is advantageously also possible for the design of the assembly to be adapted relatively easily to respective vehicle appliance designs or operating conditions.

The connection elements are preferably of identical design. Therefore, identical connection elements are used both to supply coolant to the assembly and to discharge coolant from the assembly. This reduces costs and simplifies assembly of the device.

The element halves of the cooling elements and the connection elements may be designed as deep-drawn parts and/or as castings. The individual elements of an assembly can therefore be produced in a relatively easy way in terms of production technology.

Further advantageous configurations of the invention will emerge from the description.

BRIEF DESCRIPTION OF THE DRAWINGS

The invention is explained below in an exemplary embodiment and with reference to associated drawings, in which:

FIGS. 1 to 3 show diagrammatic front, side and rear views respectively of a cooling element assembly according to the invention with vehicle components arranged between them;

FIG. 7 shows an enlarged scale diagrammatic perspective view of a cooling element according to the invention in the cooling element assemblies used in FIGS. 1 to 3;

FIG. 8 shows a diagrammatic sectional illustration of a detail of the cooling element of FIG. 7;

FIG. 10 shows a diagrammatic bottom view of a connection element which is in bearing contact with three cooling elements arranged in parallel;

FIG. 11 shows a diagrammatic side view of the connection element with cooling elements illustrated in FIG. 10, and FIG. 12 shows a diagrammatic sectional illustration of the connection element with cooling elements shown in FIG. 10 on section line XII—XII.

DESCRIPTION OF PREFERRED EMBODIMENTS

Figure 4:
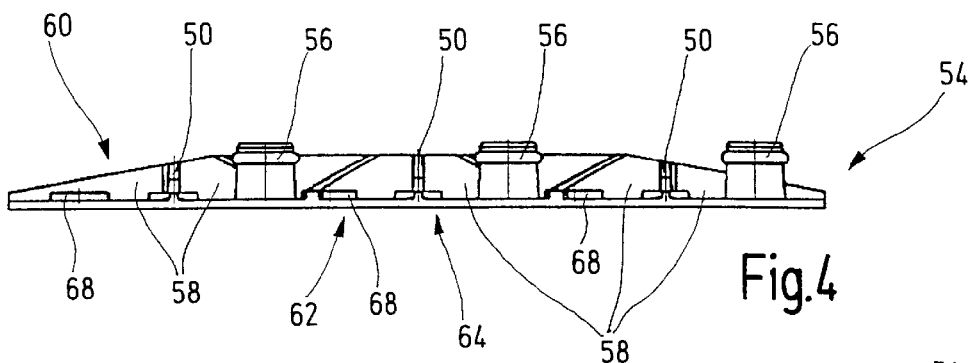
FIG. 4 shows an enlarged scale diagrammatic side view of a connection element of the cooling-element assembly shown in FIGS. 1 to 3.

FIGS. 1 to 3 show a device 10 for cooling a vehicle appliance 12. The vehicle appliance 12 may, for example, be a battery or a fuel cell. The vehicle appliance 12 includes a plurality of vehicle components 13, for example in the form of cells, which are each to be cooled by at least one of a plurality of cooling elements 14. The cooling elements 14 and the vehicle components 13 are operatively connected to one another in an exemplary arrangement of three vertical columns 15 of cooling elements, which columns are arranged parallel to one another. This produces a sandwich structure comprising cooling elements 14 and vehicle components 13 which alternate with one another and are in bearing contact with one another. At its top and bottom end sides, the sandwich structure is delimited by respective connection element 54. Each connection element 54 has three coolant openings arranged such that, for each column 15 of cooling elements, coolant can pass through the device 10 in the direction indicated by arrows 28, 30, 32. The device 10 also has a plurality of through-openings 50 for enabling mechanical clamping of the overall system by means of suitable clamping elements (for example connecting rods, not shown). A device 10 which is formed in this way therefore forms a compact, dimensionally stable cooling unit 52.

Figure 5:
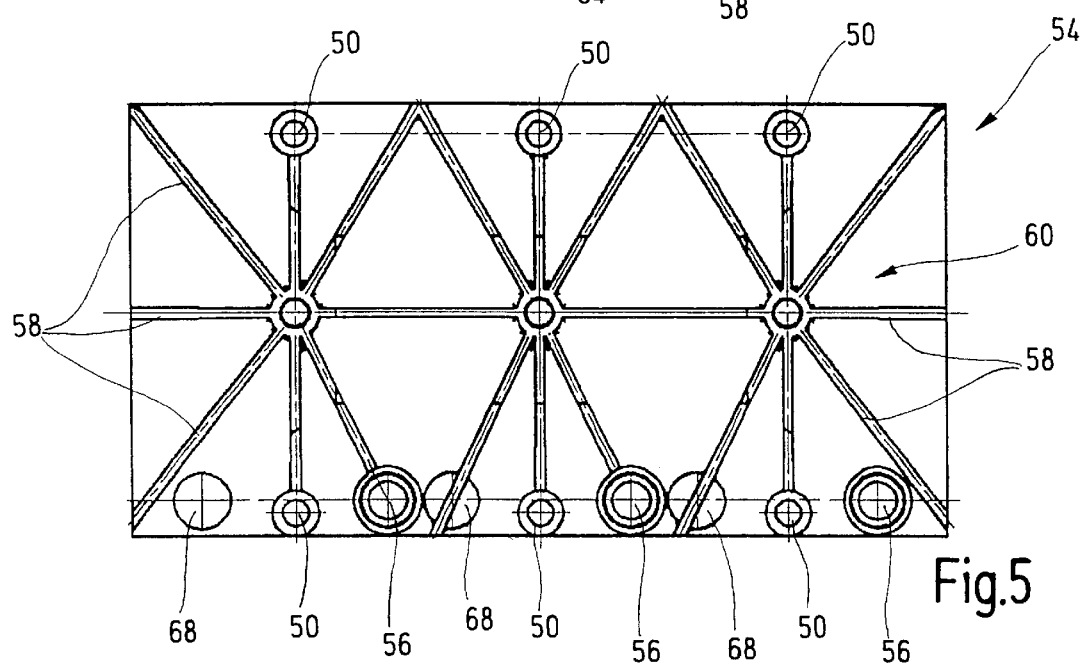
FIG. 5 shows a diagrammatic plan view of the connection element shown in FIG. 4.
Figure 6:
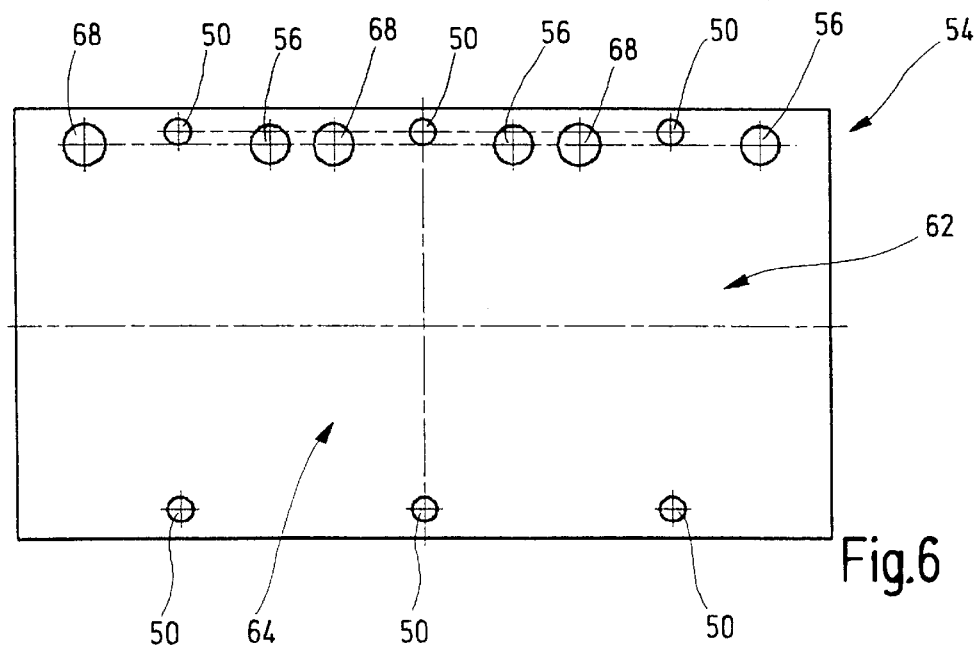
FIG. 6 shows a diagrammatic bottom view of the connection element shown in FIG. 4.

FIGS. 4 to 6 are enlarged scale diagrammatic views of the connection element 54 from FIGS. 1 to 3. The connection element 54 includes a plurality of through-openings 56, for example three, corresponding to the number of columns 15 of cooling elements. The through openings 56 may serve as coolant inlet openings or as coolant outlet openings. They are preferably formed as sockets and are suitable for an operative connection to coolant delivery means (not shown). The connection element 54 has component-reinforcing fins 58 on its outer side 60. The connection element 54 has a planar contact surface 64 on its inner side 62. FIGS. 4 to 6 illustrate the through openings 50 of the connection element 54 for enabling mechanical clamping of a sandwich structure of FIGS. 1 to 3 using suitable clamping means. The through openings 50, which are provided in particular for symmetrical clamping, are arranged along two opposite edge regions of the connection element 54. The through openings 56 which are provided for conveying coolant lie along a single edge region of the connection element 54. The connection element 54 also includes three covering regions 68. Three cooling element halves 38 are connected to the planar contact surface 64 of the connection element 54 to prevent leaks of coolant, for example by means of soldering, adhesive bonding, etc., in each case so as to form a coolant passage 40 (cf. also FIGS. 10–12).

Figure 9:
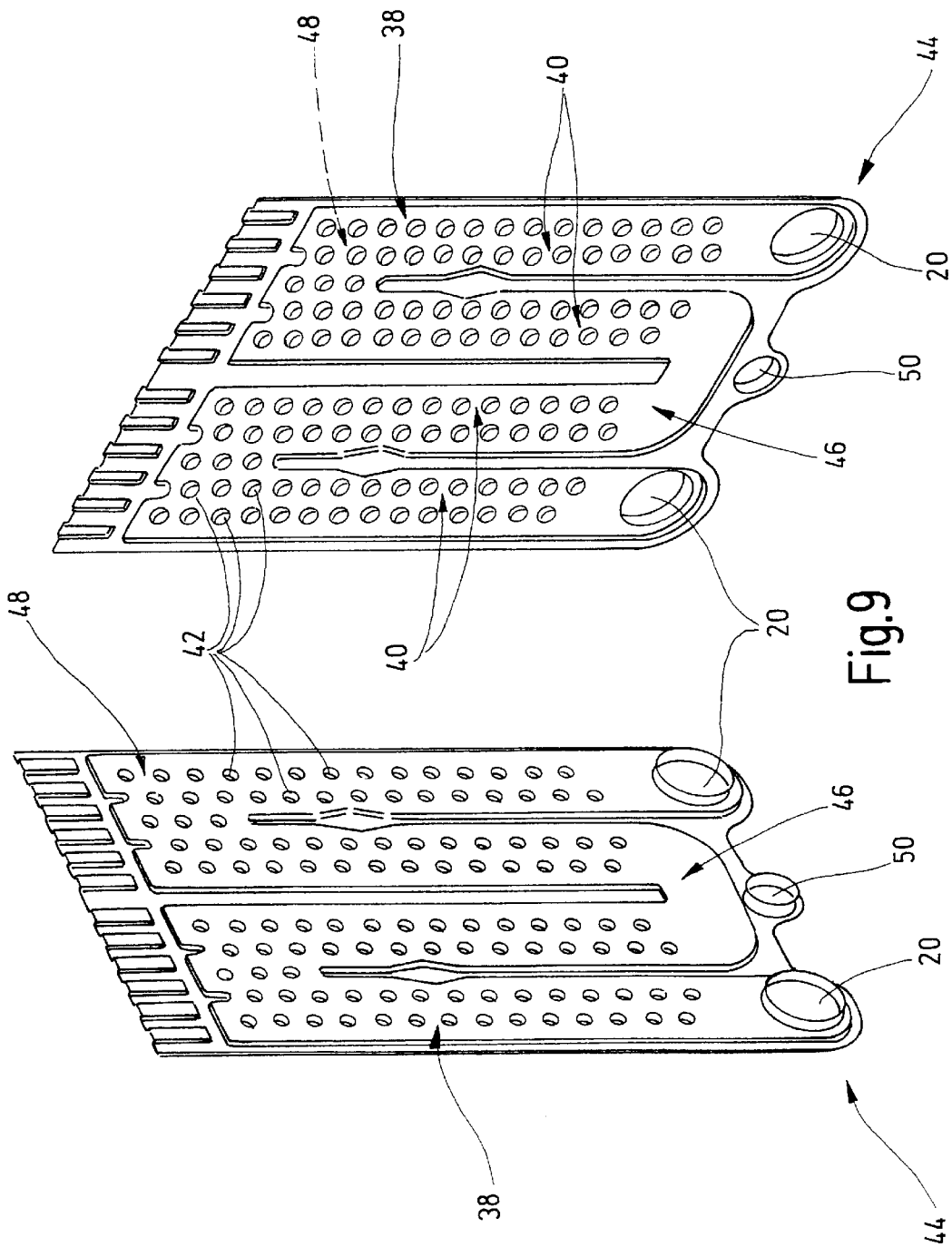
FIG. 9 shows a diagrammatic perspective illustration of two separate element halves of the cooling element shown in FIG. 7.

FIGS. 7–9 diagrammatically illustrate a cooling element 14. A coolant can flow through the cooling element 14. The element can be brought into bearing contact with at least one vehicle component 13 which is to be cooled, as shown in FIGS. 1 to 3. A first cooling-element side 16 and a second opposite cooling-element side 18, each have two connection openings 20, an inlet opening 22 and an outlet opening 24 for the coolant provided on each cooling-element side 16, 18. The connection openings 20 of the cooling element 14 are in communication with an interior space 26 in the element 14. An inlet opening 22 of the cooling element 14 on one cooling-element side (16 or 18) is arranged coaxially with respect to an outlet opening 24 on the other cooling-element side (18 or 16) of the same cooling-element 14. The connection openings 20 are designed as projections and in particular are designed to be complementary with respect to one another, as connection stubs 34 and sockets 36, in such a manner that the inlet openings 22 can be operatively connected, in an accurately fitting manner, to the outlet openings 24 of two oppositely arranged cooling elements 14 (cf. also FIGS. 1 to 3). The inlet and outlet openings 22, 24 of the cooling element 14, which are arranged coaxially with respect to one another, are directly connected, to form an axial through-connection through the cooling element 14 (cf. FIG. 8).

The cooling element 14 has a coolant passage 40 which winds from an inlet opening 22 on one cooling-element side (16 or 18) to an outlet opening 24, which is not coaxial with respect thereto and is on the other cooling-element side (18 or 16). Therefore, coolant can pass through the cooling element 14 in such a manner that a partial stream of coolant flows through the coolant passage 40, while a remaining stream of coolant is guided through two connection openings 20 (inlet opening 22 and outlet opening 24) arranged coaxially with respect to one another.

The cooling element 14 comprises two geometrically identical element halves 38 (cf. FIG. 9), which are connected to one another in such a manner as to prevent leaks of coolant. Each element half 38 has a plurality of inwardly projecting stabilizing studs 42 which are at a distance from one another. Each two stabilizing studs 42 which lie opposite one another are in bearing contact with one another at their ends (FIG. 7). The element halves 38 are surface structured half-shells 46, having a respective, substantially planar contact surface 48.

The cooling element 14 includes a through opening 50 for producing mechanical clamping between a plurality of cooling elements 14 and intervening vehicle components 13, as well as connection elements 54 arranged at the end sides, so as to form a dimensionally stable sandwich structure as shown in FIGS. 1 to 3. The connection openings 20 and the through-opening 50 of the cooling element 14 are arranged in an edge region 44 on the corresponding cooling element side 16, 18.

FIGS. 10 to 12 show diagrammatic illustrations of the connection element 54 illustrated in FIGS. 1 to 3 with three element halves 38, which are arranged in parallel and are connected to the connection element 54, of the cooling elements 14. As shown in FIG. 11, for example, coolant can be supplied to the cooling element 14 (or element half 38) through the through-opening 56 of the connection element 54, with a partial stream of coolant flowing through the coolant passage 40 (cf. FIG. 10) to the connection stub 34 and a remaining stream of coolant being guided directly to the coaxially arranged socket 36, i.e. without flowing through the coolant passage 40. The connection stub 34 and the socket 36 of the respective cooling element 14 shown in FIG. 11 can be used to connect further cooling elements 14 of complementary design, in a manner to prevent leaks of coolant, so as to form a respective connection stub/socket operative connection. An intervening space is also formed which is delimited by substantially planar contact surfaces 48, which are used for heat transfer. In this case, the desired heat transfer is effected from a vehicle component 13, which is arranged in the space and is to be cooled, to the cooling elements 14 via the contact surface 48 and by means of coolant passing through the coolant passage 40 (cf. also FIGS. 1 to 3).

As illustrated in FIG. 10, the connection openings 20 (connection stubs 34 and sockets 36) of a respective element half 38 of a cooling element 14 (and therefore also of further cooling elements 14 connected to the element half 38) are arranged along an edge region 44. In a prefabricated or preassembled device 10, as shown in FIGS. 1 to 3, comprising two connection elements 54 and a plurality of cooling elements 14 which are operatively connected to one another in such a manner as to prevent leaks of coolant. This makes it possible to form spaces for receiving the vehicle components 13, to create, in a simple-to-assemble manner, a sandwich structure with a corresponding number of vehicle components 13. Because access to the respective spaces between two oppositely arranged cooling elements 14 is limited by the connection stubs 34 and sockets 36 only in the edge region 44, the vehicle components 13 (for example cells) can be pushed without problem into the space from the opposite side from the edge region 44 in order to produce the desired sandwich structure. Then, the entire cooling unit 52 with vehicle components 13 arranged in between can be clamped in a dimensionally stable manner by suitable clamping elements (not shown). The stabilizing studs 42 of a respective cooling element 14 ensure that the contact surfaces 48 remain substantially planar even after clamping of the device 10, ensuring beneficial bearing contact for heat transfer between a respective cooling element 14 and a vehicle component 13 resting thereon.

The abutting surfaces of the cooling elements 14 belonging to a respective column 15 of cooling elements are to be connected in such a manner as to prevent leaks of coolant. For example, they may be soldered together in an automated soldering furnace provided for this purpose. Alternatively, connection by means of adhesive bonding or flanging is also conceivable. Furthermore, the element halves 38 of the cooling elements 14 and the connection elements 54 are preferably formed from metal and are designed as deep-drawn parts and/or as castings.

The modular design of the device 10 advantageously makes it possible, in a relatively simple way, to adapt to the particular design conditions of a vehicle.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for cooling a coolable appliance in a vehicle, the device comprising:
    a plurality of cooling elements, each element comprising a cooling body with an interior through which coolant can be flowed, the body including surfaces which can be brought into bearing contact with the appliance which is to be cooled, the cooling element having a first cooling element side having a body surface and an opposite second cooling element side having a body surface;
    a first inlet connection opening and a first outlet connection opening on each of the first cooling element sides respectively for inlet and outlet of coolant to the interior space of the body of the respective cooling element;
    a second inlet connection opening and a second outlet connection opening on each of the second cooling element sides respectively for inlet and outlet of coolant to the interior space of the body of the respective cooling element.

2. The device of claim 1, wherein all of the plurality of the cooling elements are identical.

3. The device of claim 2, wherein each of the cooling elements is comprised of two geometrically identical cooling element halves and the cooling element halves are connected to one another in a manner as to prevent leak of coolant from the assembled halves of the cooling element.

4. The device of claim 1, wherein the cooling elements are arrayed so that the outlet opening of one of the cooling elements is operatively connected to the inlet opening of another of the cooling elements, whereby coolant is passed from one cooling element to the next cooling element in a series.

5. The device of claim 4, wherein each of the first and second inlet and outlet connection openings has the form of a projection from the respective first and second cooling element sides.

6. The device of claim 5, wherein the inlet opening of the first cooling element side of one of the cooling elements is arranged coaxially with respect to the outlet opening on the second cooling element side of the same cooling element.

7. The device of claim 6, wherein each inlet opening on one of the cooling element sides of one of the cooling elements is coaxial with a respective one of the outlet openings on the other cooling element side of the one cooling element.

8. The device of claim 7, wherein each cooling element interior includes a coolant passage which extends through the interior of the cooling element from the first inlet opening on the first cooling element side to the second outlet opening on the second cooling element side.

9. The device of claim 6, wherein the cooling elements have an edge region and the inlet and outlet openings on the first and second cooling element sides are in the edge region of the cooling element.

10. The device of claim 9, further comprising a through opening extending through the cooling element between the inlet opening and the outlet opening and the through opening is not operably connected to the interior of the cooling element through which the coolant moves, the through opening enabling mechanical coupling of the cooling elements to each other on an appliance component arranged between adjacent cooling elements.

11. The device of claim 7, wherein the respective coaxial inlet and outlet openings of the cooling element are directly connected to each other permitting passage of coolant from the inlet to the outlet openings and in addition are connected to the interior of the respective cooling element for enabling passage of a coolant through the cooling element.

12. The device of claim 6, wherein the inlet openings and the outlet openings of each of the plurality of the cooling elements are complementary in shape with respect to one another such that an inlet opening of one of the cooling elements and an outlet opening of another of the cooling elements can be engaged with each other.

13. The device of claim 12, wherein one of the inlet and outlet openings is a connection stub and the other of the inlet and outlet openings is a socket for receiving the connection stub.

14. The device of claim 4, wherein each of the inlet openings on each of the cooling element sides is coaxial with a respective one of the outlet openings on the other cooling element side.

15. The device of claim 4, wherein each of the cooling elements is comprised of two geometrically identical cooling element halves and the cooling element halves are connected to one another in a manner as to prevent leak of coolant from the assembled halves of the cooling element.

16. The device of claim 15, wherein each cooling element half has a plurality of respective stabilizing studs therein positioned so that when the element halves are connected, two respective stabilizing studs in the respective elements halves lie opposite and in bearing contact with one another.

17. The device of claim 15, wherein each of the cooling elements halves is shaped as a surface structured half shell so as to form a respective substantially planar contact surface with an appliance.

18. The device of claim 15, wherein there are a plurality of the cooling elements in a row thereof together defining a cooling unit, the cooling unit having end sides, and a respective connecting element in an end side and including a through opening operably connected to and associated with intervening element half of an adjacent cooling element in a manner to prevent leak of coolant.

19. The device of claim 4, wherein each cooling element interior includes a coolant passage which extends through the interior of the cooling element from the first inlet opening on the first cooling element side to the second outlet opening on the second cooling element side.

20. The device of claim 4, further comprising a through opening extending through the cooling element between the inlet opening and the outlet opening and the through opening is not operably connected to the interior of the cooling element through which the coolant moves, the through opening enabling mechanical coupling of the cooling elements to each other on an appliance component arranged between adjacent cooling elements.

21. The device of claim 4, wherein there are a plurality of the cooling elements in a row thereof together defining a cooling unit, the cooling unit having end sides, and a respective connecting element in an end side and including a through opening operably connected to one of the inlet and outlet openings of an adjacent cooling element in a manner to prevent leak of coolant.

22. The device of claim 21, wherein each of the connecting elements has an outer side outward of the assembled cooling unit and has a component reinforcing fin on the outer side thereof, each connecting element having an inner side with a planar contact surface in contact with the cooling element adjacent to the connecting element.

23. The device of claim 21, wherein the cooling elements operatively connected to one another and between connection elements arranged at the end sides of an array of cooling elements are preassembled as an assembly to form a sandwich structure for cooperating with a plurality of appliance components to be cooled at the surfaces of the cooling elements in the sandwich structure.

24. The device of claim 4, wherein there is an operative connection between an inlet opening of each cooling element and the respective outlet opening of an adjacent one of the cooling elements and the operative connections between the inlet openings and the outlet openings are adapted to prevent leak of coolant at the connections.

25. The device of claim 4, wherein the respective inlet and outlet openings of the cooling element are directly connected to each other permitting passage of coolant from the inlet to the outlet openings and in addition are connected to the interior of the respective cooling element for enabling passage of a coolant through the cooling element.

26. The device of claim 4, wherein the appliance to be cooled is a battery or a fuel cell and the cooling elements are shaped for fitting against the surfaces of the battery or fuel cell for cooling the battery or fuel cell.

* * * * *